US008576726B2

(12) United States Patent
Cho et al.

(10) Patent No.: US 8,576,726 B2
(45) Date of Patent: Nov. 5, 2013

(54) COMMUNICATION AND METHOD

(75) Inventors: Seung Kwon Cho, Guri (KR); Jung Hoon Oh, Daejeon (KR); Su Chang Chae, Daejeon (KR); Young-Il Kim, Daejeon (KR)

(73) Assignees: Samsung Electronics Co., Ltd, Suwon-si (KR); Electronics and Telecommunications Research Institute, Daejeon (KR)

( * ) Notice: Subject to any disclaimer, the term of this patent is extended or adjusted under 35 U.S.C. 154(b) by 504 days.

(21) Appl. No.: 12/735,166

(22) PCT Filed: Oct. 13, 2008

(86) PCT No.: PCT/KR2008/006024
§ 371 (c)(1),
(2), (4) Date: Jun. 18, 2010

(87) PCT Pub. No.: WO2009/078567
PCT Pub. Date: Jun. 25, 2009

(65) Prior Publication Data
US 2010/0265828 A1    Oct. 21, 2010

(30) Foreign Application Priority Data

Dec. 18, 2007   (KR) .......................... 10-2007-0133662

(51) Int. Cl.
*G01R 31/06*    (2006.01)
(52) U.S. Cl.
USPC ............................. 370/242; 370/254; 370/255
(58) Field of Classification Search
USPC ......... 370/217, 394, 395, 470, 510, 254, 255, 370/311, 312, 324, 348, 350, 341, 433, 437, 370/442, 468
See application file for complete search history.

(56) References Cited

U.S. PATENT DOCUMENTS

| 6,314,100 | B1 | 11/2001 | Roach et al. | |
|---|---|---|---|---|
| 6,490,271 | B1 * | 12/2002 | Erjanne | 370/347 |
| 7,526,288 | B2 * | 4/2009 | Eom et al. | 455/435.1 |
| 7,796,547 | B2 * | 9/2010 | Etemad et al. | 370/328 |
| 7,852,826 | B2 * | 12/2010 | Kitchin | 370/349 |

(Continued)

FOREIGN PATENT DOCUMENTS

| KR | 10-2001-0042178 | 5/2001 |
|---|---|---|
| KR | 10-2005-0067333 | 7/2005 |

(Continued)

OTHER PUBLICATIONS

International Search Report and Written Opinion of International Searching Authority dated May 18, 2009 in relation to International Application No. PCT/KR2008/006024.

*Primary Examiner* — Huy D Vu
*Assistant Examiner* — Kuo T Chiang

(57) ABSTRACT

A communication method according to the present invention includes receiving MAP in formation, acquiring an initial scheduled frame number and a current frame number from the MAP information, calculating the difference between the initial scheduled frame number and the current frame number, comparing the difference between the initial scheduled frame number and the current frame number with a reference value and setting a scheduled frame number, and performing transmission or reception in the scheduled frame. Therefore, even though a MAP loss occurs, the mobile station can receive only downlink data effective in downlink, thereby reducing power consumption for unnecessary reception, and can exactly perform transmission in a frame in which it should transmit in uplink.

14 Claims, 3 Drawing Sheets

(56) References Cited

U.S. PATENT DOCUMENTS

| | | | |
|---|---|---|---|
| 8,014,327 B2 * | 9/2011 | Waldeck et al. | 370/310 |
| 8,054,894 B2 * | 11/2011 | Xiao et al. | 375/260 |
| 2006/0117054 A1 | 6/2006 | Li et al. | |
| 2006/0293008 A1 | 12/2006 | Hiraki et al. | |
| 2007/0155932 A1 | 7/2007 | Spyrou et al. | |
| 2007/0230432 A1 | 10/2007 | Choi et al. | |
| 2008/0045145 A1 * | 2/2008 | Nakatsugawa | 455/11.1 |
| 2008/0080474 A1 * | 4/2008 | Kitchin | 370/349 |

FOREIGN PATENT DOCUMENTS

| | | |
|---|---|---|
| KR | 10-2006-0039935 | 5/2006 |
| KR | 10-2007-0073618 | 7/2007 |
| KR | 10-2007-0084779 | 8/2007 |
| KR | 10-0755209 | 8/2007 |

* cited by examiner

COMMUNICATION AND METHOD

CROSS-REFERENCE TO RELATED APPLICATION(S)

The present application is related to International Application No. PCT/KR2008/006024 filed Oct. 13, 2008 entitled "COMMUNICATION DEVICE AND METHOD" which claims priority to Korean Patent Application No. 10-2007-0133662 filed Dec. 18, 2007. International Application No. PCT/KR2008/006024 is assigned to the assignee of the present application and is hereby incorporated by reference into the present disclosure as if fully set forth herein. The present application hereby claims priority under 35 U.S.C. §119(a) to International Patent Application No. PCT/KR2008/006024 and Korean Patent Application No. 10-2007-0133662.

TECHNICAL FIELD

The present invention relates to a communication device and communication method. In particular, the present invention relates to a communication device and communication method based on MAP analysis of a mobile station, which provides portable internet services through a wireless access network with a base station.

BACKGROUND ART

In an IEEE 802.16 (Institute of Electrical and Electronics Engineers 802.16)-based wireless access network, a base station transmits, in every frame, a MAP including information on allocation of resources to users and other information to all mobile stations.

The map includes a downlink (DL) MAP having information on downlink sub-frames and an uplink (UL) MAP having information on uplink sub-frames. Sub-frames having MAP relevance with information included in the DL MAP and the UL MAP are a downlink sub-frame of a corresponding frame and an uplink sub-frame of the corresponding frame designated by an allocation start time field of the UL MAP.

Allocation information is defined in detail by a MAP information element (MAP IE) consisting of the DL MAP and UL MAP.

Transmission/reception such as transmission of acknowledgement (ACK) for DL hybrid ARQ (HARM), channel quality information (CQI) and feedback header transmission, the following DL/UL fixed-allocation, and so on, is performed in a frame scheduled by information acquired from related MAP IE or an uplink channel description (UCD) message, not in a transmission/reception frame designated by MAP relevance.

In an IEEE802.16-based wireless access technique, a method of distinguishing a scheduled frame is not defined, and a mobile station reads a frame number that increases by 1 for every frame and is included in the MAP, thereby distinguishing each frame, and thus determines whether a number of a scheduled frame is the same as a number of a received frame to perceive whether the received frame is the scheduled frame.

However, when the mobile station has failed to demodulate and decode a MAP burst such that it does not acquire MAP information and has a received MAP in a frame after a scheduled frame, since the scheduled frame number is not the same as the number of the received frame, the mobile station continues to wait for the scheduled frame.

Meanwhile, a scheduled frame can be sought by counting the number of frame synchronization signals without using frame numbers. However, when the mobile station loses a frame synchronization signal, it may not exactly perceive the number of frames and thus may transmit or receive data in a frame other than the scheduled frame. If reception is performed in a frame other than the scheduled frame, unnecessary power is consumed. Further, when DL HARQ is performed, a base station requests ineffective retransmission due to cyclic redundancy checking (CRC) error occurrence. If transmission is performed in a frame other than the scheduled frame, the mobile station transmits data through a resource on an uplink sub-frame not having been allocated and thus the base station cannot receive the data, and if the mobile station performs transmission through a resource allocated to anther mobile station, a collision occurs.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a communication device and method having advantages of being capable of normally determining a transmission/reception scheduled frame even in a MAP loss state.

Technical Solution

An exemplary embodiment of the present invention provides a communication device. The communication device includes a perceiving unit acquiring an initial scheduled frame number and a current frame number from MAP information, an operator receiving the initial scheduled frame number and the current frame number from the perceiving unit and calculating a difference between the initial scheduled frame number and the current frame number, and a determining unit comparing the difference between the initial scheduled frame number and the current frame number with a reference value and setting a new scheduled frame number.

The perceiving unit may analyze a MAP of the current frame to acquire the initial scheduled frame number and the current frame number.

If the difference between the initial scheduled frame number and the current frame number is smaller than the reference value, the determining unit may determine the initial scheduled frame number as a scheduled frame number.

If the difference between the initial scheduled frame number and the current frame number is equal to or larger than the reference value, the determining unit may calculate the new scheduled frame number.

In case of non-periodic transmission or reception, if the difference between the initial scheduled frame number and the current frame number is larger than the reference value, the determining unit may determine that transmission or reception has failed.

In case of periodic transmission or reception, if the difference between the initial scheduled frame number and the current frame number is larger than the reference value, the determining unit may update the scheduled frame number by calculating the sum of the initial scheduled frame number and a period of the periodic reception or transmission to acquire the new scheduled frame number.

The operator may calculate the difference between the acquired scheduled frame number and the current frame number.

The determining unit may update the scheduled frame number until the difference between the updated scheduled frame number and the current frame number becomes smaller than the reference value.

The determining unit may update the scheduled frame number a threshold number of times or less.

If the transmission or reception is periodic, the reference value may be larger than a period of the signal.

Another embodiment of the present invention provides a communication method. The method includes receiving MAP information, acquiring an initial scheduled frame number and a current frame number from the MAP information, calculating a difference between the initial scheduled frame number and the current frame number, comparing the difference between the initial scheduled frame number and the current frame number with a reference value and updating a scheduled frame number, and transmitting or receiving a signal in the scheduled frame.

In the setting of the scheduled frame number, the current frame may be determined as the scheduled frame if the difference between the scheduled frame number and the current frame number is equal to zero.

In the setting of the scheduled frame number, the scheduled frame number may be updated according to a period of the transmission or reception if the difference between the initial scheduled frame number and the current frame number is equal to or larger than the reference value.

The scheduled frame number may be determined according to the sum of the initial scheduled frame number and the period of the transmission or reception.

The scheduled frame number may be updated until the difference between the scheduled frame number and the current frame number becomes smaller than the reference value.

The scheduled frame number may be updated a threshold number of times or less.

If the signal is a periodic signal, the reference value may be larger than the period of the transmission or reception.

Advantageous Effects

According to the exemplary embodiments of the present invention, even though MAP loss occurs, the mobile station can receive only downlink data that is effective in downlink, thereby reducing power consumption for unnecessary reception, and can exactly perform transmission in a frame that it should transmit in uplink. Therefore, it is possible to prevent a collision that can occur when transmission is performed in an ineffective frame, and thus to prevent an unnecessary waste of resources.

Further, when the mobile station has normally received the MAP after a scheduled frame due to MAP loss, the number of updating times for seeking for the next scheduled frame is restricted. Therefore, it is possible to guarantee the worst MAP decoding time given during system design.

MODE FOR THE INVENTION

Figure 1:
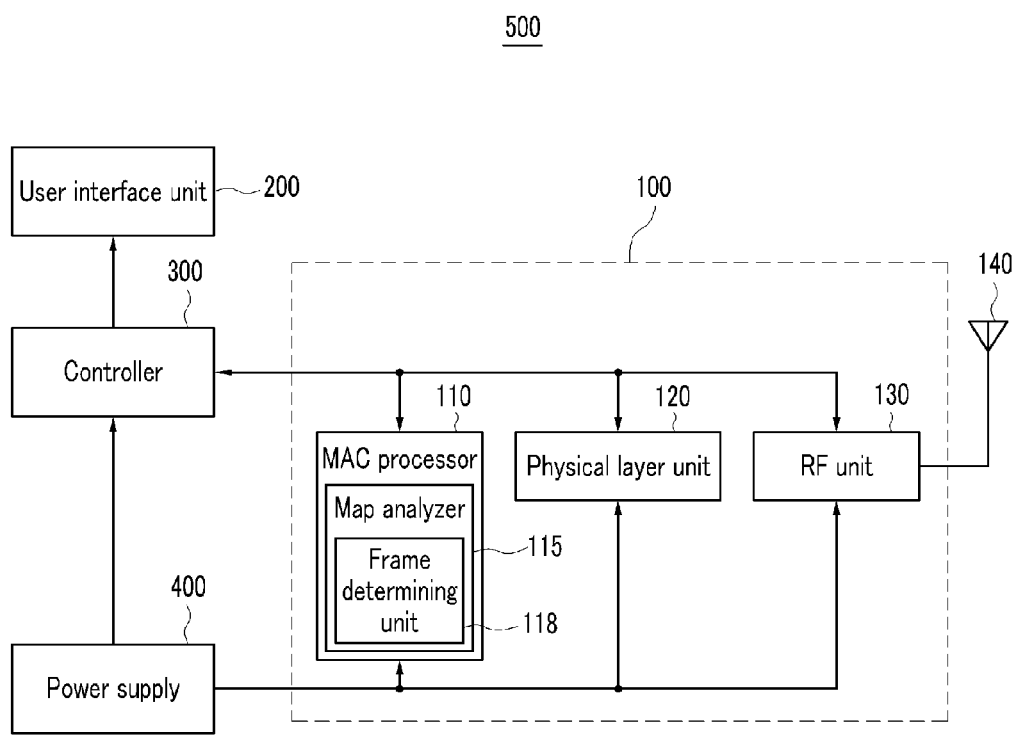
FIG. 1 is a block diagram illustrating a mobile station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation and can be implemented by hardware components or software components and combinations thereof.

In this specification, a mobile station (MS) may designate a terminal, a mobile terminal (MT), a subscriber station (SS), a portable subscriber station (PSS), user equipment (UE), an access terminal (AT), etc., and may include functions of all or a part of a terminal, a mobile terminal, a subscriber station, a portable subscriber station, user equipment, an access terminal, etc.

In this specification, a base station (BS) may represent an access point (AP), a radio access station (RAS), a node B, a base transceiver station (BTS), a mobile multihop relay (MMR)-BS, and the like. Further, the base station may have the entire or partial functions of the access point, the radio access station, the node B, the base transceiver station, the MMR-BS, and the like.

Hereinafter, a scheduled-frame determining method of a mobile station according to an exemplary embodiment of the present invention will be described with reference to FIG. 1.

A communication system according to an exemplary embodiment of the present invention includes base stations and mobile stations. Each of the base stations takes charge of a cell. The cell may include a plurality of sectors, and the base station communicates with mobile stations in the cell.

FIG. 1 is a block diagram illustrating a mobile station according to an exemplary embodiment of the present invention.

Referring to FIG. 1, a mobile station 500 according to an exemplary embodiment of the present invention includes a signal processor 100, a user interface unit 200, a controller 300, and a power supply 400.

The user interface unit 200 is used for receiving an input from a user or providing information to the user, and may be composed of a liquid crystal display device, a key pad, etc.

The controller 300 is a processor having application programs, and is in cooperation with the signal processor 100 to transmit data of the application programs to a base station through the signal processor 100.

The power supply 400 includes a battery, and supplies power to all components of the mobile station 500.

The signal processor 100 includes a MAC processor 110, a physical layer unit 120, an RF unit 130, and an antenna 140. The signal processor converts the user data from the controller 300 into a high-frequency signal and transmits the high-frequency signal to the base station, and the signal processor receives a high-frequency signal from the base station and delivers the user data to the controller 300.

The MAC processor 110 is connected to the controller 300 to transmit/receive user data and control data, and performs medium access control (MAC) such as system connection, bandwidth allocation request, connection set, and connection management.

The MAC processor 110 includes a MAP analyzer 115. The MAP analyzer 115 analyzes a MAP transmitted from the base station to give information on allocation of resources to users and other control information. The MAP analyzer 115 includes a frame determining unit 118 for comparing a frame number included in the MAP with a frame number of a frame that has been scheduled to be transmitted or received.

The operation of the frame determining unit 118 will be described in detail below.

The physical layer unit 120 performs channel coding/decoding and modulation/demodulation on packet data, which is transmitted/received by the MAC processor 110 and the base station, so that the packet data is appropriate for a wireless channel environment.

The RF unit 130 converts a signal transmitted from the physical layer unit 120 into a high-frequency signal and transmits the high-frequency signal to the base station through the antenna 140. Also, the RF unit converts a high-frequency signal transmitted from the base station into a base-band signal and transmits the base-band signal to the physical layer unit 120.

Hereinafter, a scheduled-frame determining method of the frame determining unit 118 according to an exemplary embodiment of the present invention will be described with reference to FIGS. 2 to 9.

The MAP analyzer 115 analyzes a received MAP to extract transmission/reception allocation information regarding uplink and downlink sub-frames.

The allocation information regarding the downlink and uplink sub-frames is defined in detail by a MAP IE constituting a DL MAP and an UL MAP, and a scheduled frame is defined as a frame that has been scheduled to transmit or receive signals among frames other than a frame designated according to the kind of MAP IE by MAP relevance.

For example, an ACK for a downlink burst allocated by IE related to a downlink HARQ is transmitted after an L-th frame (wherein L is 1, 2, or 3) defined by a UCD message parameter. In cases of CQI transmission of the mobile station 500 by CQI allocation IE, feedback header transmission of the mobile station 500 by feedback polling IE, and so on, the mobile station 500 receives MAP IE once, and continues transmitting for a predetermined time period at regular intervals.

Further, in the case of fixed allocation IE that is expected to be supported by a base station and the mobile station 500, the mobile station receives uplink or downlink fixed allocation MAP IE such as a circuit mode once, and transmission or reception continues during a predetermined period at regular intervals. The mobile station 500 transmits or receives a scheduled frame other than a frame designated by MAP relevance, and the scheduled frame is dynamically determined according to a UCD message or a MAP IE parameter. When receiving the MAP IE, the frame determining unit 118 of the mobile station 500 stores a scheduled frame number, compares the scheduled frame number with a current frame number included in a MAP received later, and performs transmission/reception.

In the case of periodic transmission/reception, immediately after transmission/reception, the MAP analyzer 115 updates the next scheduled frame number by a period designated in MAP IE, thereby making periodic transmission/reception possible.

Figure 2:
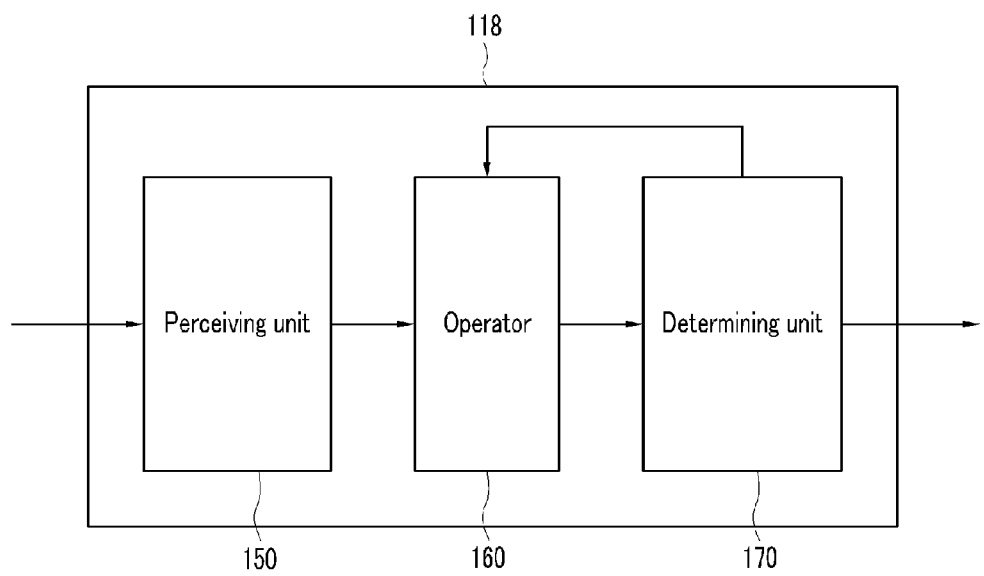
FIG. 2 is a diagram illustrating the configuration of a frame determining unit.
Figure 3:
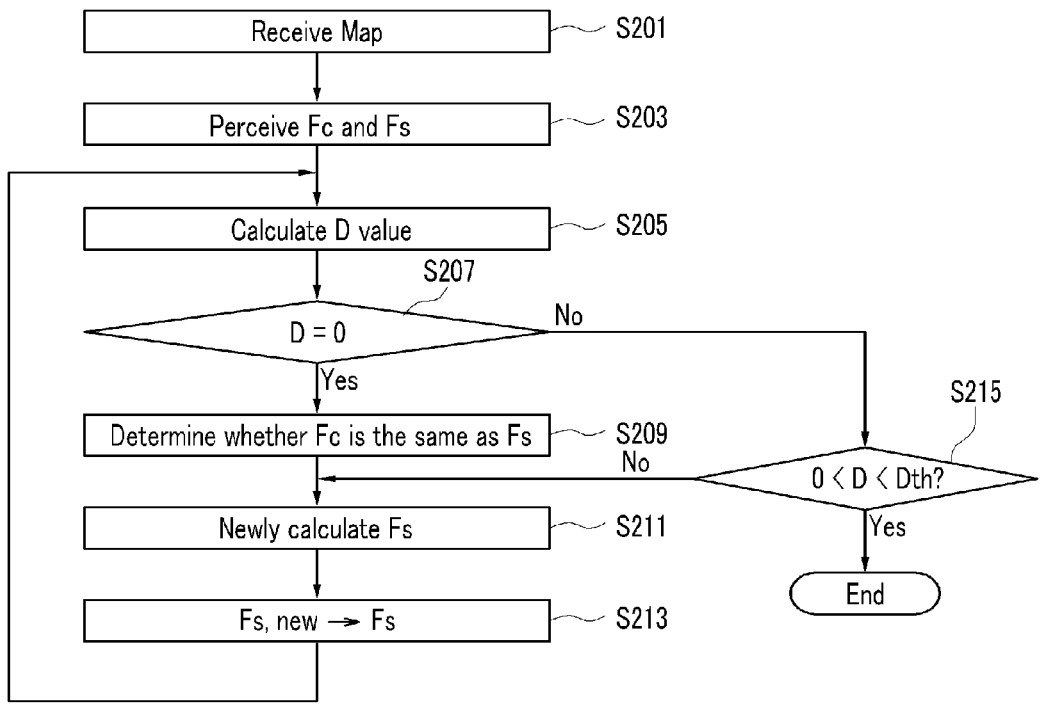
FIG. 3 is a flowchart illustrating the operation of the frame determining unit of the mobile station.

FIG. 2 is a diagram illustrating the configuration of a frame determining unit, and FIG. 3 is a flowchart illustrating the operation of a frame determining unit of a mobile station.

The frame determining unit 118 includes a perceiving unit 150, an operator 160, and a determining unit 170 as shown in FIG. 2. Referring to FIG. 3, the mobile station 500 receives a MAP of the current frame, and the MAP analyzer 115 analyzes the MAP (S201). At this time, the determining unit 170 determines whether the current frame is the scheduled frame that has been scheduled to transmit or receive signals.

Figure 4:
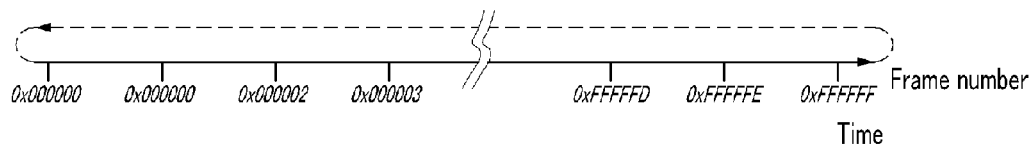
FIG. 4 is a view illustrating numbering of frame numbers included in MAPs.

FIG. 4 shows numbering of frames included in MAPs.

Referring to FIG. 4, frame numbers are 24-bit digital values and increase by one every frame. When the frame number becomes the maximum 0xFFFFFF, it returns to 0x000000 and increases by one.

In other words, a base station calculates the next frame number $F_N$ ($F_N$=0000000, 0x000001, 0x000002, . . . , 0xFFFFFF) from the current frame number $F_C$ ($F_C$=0x000000, 0x000001, 0x000002, . . . , 0xFFFFFF) by Equation 1, and transmits the MAP including the next frame number to the mobile station 500.

$$F_N=(F_C+1)\bmod 0x1000000 \qquad \text{[Equation 1]}$$

Here, mod means a modulo operation.

Figure 5:
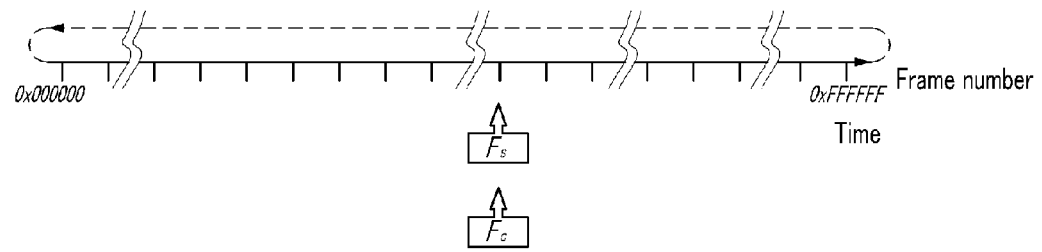
FIG. 5 is a view illustrating a case where a current frame number and a scheduled frame number are the same.

FIG. 5 shows a case where the current frame number and the scheduled frame number are the same.

Referring to FIG. 5, the perceiving unit 150 of the frame determining unit 118 perceives the frame number $F_C$ (=0x000000, 0x000001, 0x000002, . . . , 0xFFFFFF) of the received current frame and the frame number $F_S$ (=0x000000, 0x000001, 0x000002, . . . , 0xFFFFFF) of the scheduled frame (S203), and compares the frame number of the current frame with the frame scheduled frame number. When the two frame numbers are the same, the mobile station 500 performs scheduled transmission/reception.

Figure 6:
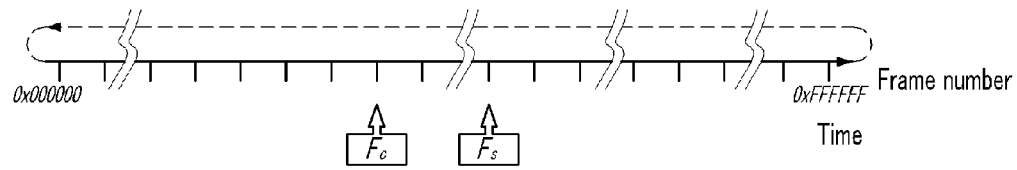
FIG. 6 and FIG. 7 are views illustrating cases where a scheduled frame precedes a current frame.
Figure 7:
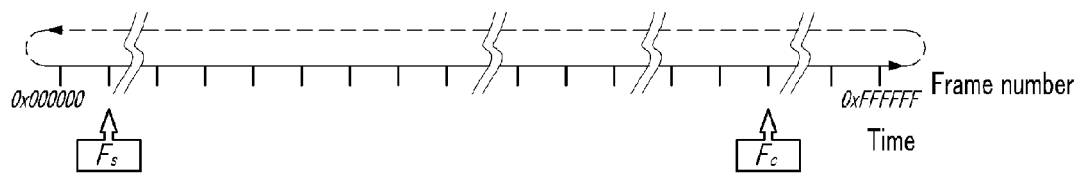

FIG. 6 and FIG. 7 are views illustrating cases where the scheduled frame precedes the current frame. When the scheduled frame prededes the current frame, that is, when the scheduled frame number $F_S$ is larger than the current frame number $F_C$ as shown in FIG. 6, the mobile station 500 does not perform transmission/reception because the current frame is not the scheduled frame.

When the scheduled frame number $F_S$ is larger than the maximum value of the frame numbers, 0xFFFFFF, and accordingly the modulo operation is performed, whereby the scheduled frame number becomes smaller than the current frame number $F_C$ as shown in FIG. 7, the mobile station 500 does not perform transmission/reception because the current frame is not the scheduled frame.

Figure 8:
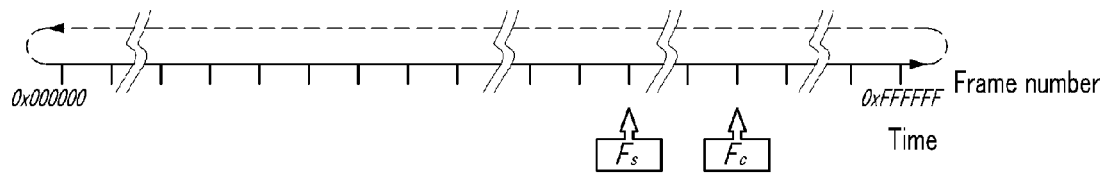
FIG. 8 and FIG. 9 are views illustrating cases where a scheduled frame follows a current frame due to MAP loss.
Figure 9:
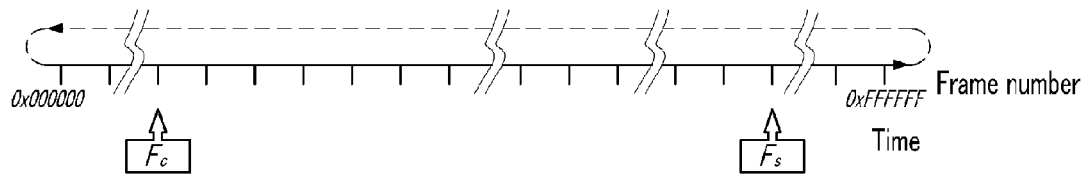

FIG. 8 and FIG. 9 are views illustrating cases where the scheduled frame follows the current frame due to MAP loss.

Referring to FIG. 8, when MAP loss occurs and then normal MAP reception is performed before a frame whose frame number is 0xFFFFFF, the current frame number $F_C$ is larger than the scheduled frame number $F_S$.

Referring to FIG. 9, when MAP loss occurs and then normal MAP reception is performed after a frame whose frame number is 0xFFFFFF, the current frame number $F_C$ is smaller than the scheduled frame number $F_S$.

When MAP loss occurs as described above, in order to determine whether the current frame is the scheduled frame, the operator 160 of the frame determining unit 118 performs an operation such as Equation 2 (S205).

$$D=\{(F_S+0x1000000)-F_C\} \bmod 0x1000000$$
$$(0 \le D \le 0xFFFFFF) \quad \text{[Equation 2]}$$

D values in the cases shown in FIG. 5 to FIG. 9 are obtained as shown in the following Table 1.

TABLE 1

| CASE | D value |
| --- | --- |
| FIG. 5 | 0 |
| FIG. 6 | 0 < D << 0xFFFFFF |
| FIG. 7 | 0 < D << 0xFFFFFF |
| FIG. 8 | 0 << D ≤ 0xFFFFFF |
| FIG. 9 | 0 << D ≤ 0xFFFFFF |

As shown in Table 1, in the case shown in FIG. 5, the D value always becomes 0.

In both of the cases shown in FIG. 6 and FIG. 7, the D value is larger than 0 and much smaller than the maximum value. For example, in cases of CQI transmission, feedback header transmission, and so on, since the maximum period is 8 frames, the D value is smaller than 8.

In the cases shown in FIG. 8 and FIG. 9, MAP loss causes a MAP to be normally received after the scheduled frame and thus the D value is much larger than 0 and smaller than or equal to 0xFFFFFF.

Then, the determining unit 170 according to an exemplary embodiment of the present invention determines whether the calculated D value is 0 (S207).

If determining that the D value is 0, the determining unit 170 determines that the current frame is the scheduled frame as shown in FIG. 5 (S209) and transmits/receives the current frame.

In the case of periodic transmission/reception, immediately after transmission/reception, the determining unit 170 adds the scheduled frame number to a predetermined period designated in MAP IE to obtain a new scheduled frame number $F_{S, new}$ (S211), and perceives the new scheduled frame number as a scheduled frame number for use in the next period (S213).

Meanwhile, if the D value is not 0, the frame determining unit 118 compares the calculated D value with a reference value Dth (S215).

In this case, the reference value Dth is larger than a transmission/reception period and smaller than 0xFFFFFF.

If the D value is smaller than the reference value Dth, it is determined as the case shown in FIG. 6 or 7 and thus the mobile station does not perform transmission or reception.

If the D value is larger than the reference value Dth, it is determined that the mobile station has normally received the MAP after the scheduled frame due to MAP loss, like the case shown in FIG. 8 or 9.

In the case of DL HARQ ACK transmission, since periodic transmission is not performed, if the D value regarding to DL HARQ ACK is larger than the reference value Dth, the determining unit 170 determines that DL HARQ ACK transmission has failed.

In cases of periodic transmission, such as CQI transmission, feedback header transmission, and DL/UL fixed allocation, first, it is determined whether the current frame number $F_C$ is in a duration allocated for transmission/reception.

If the current frame number $F_C$ exceeds the duration allocated for transmission/reception, the determining unit 170 releases periodic transmission/reception allocation.

Meanwhile, if the current frame number $F_C$ is in the duration allocated for periodic transmission/reception, an operation as Equation 3 is performed to generate a new scheduled frame number $F_{S,new}$ (=0x000000, 0x000001, 0x000002, . . . , 0xFFFFFF) (S211).

$$F_{S,new}=(F_S+P) \bmod 0x1000000 \ (0<P<<0xFFFFFF) \quad \text{[Equation 3]}$$

Here, Fs represents the existing scheduled frame number, and P represents the period of periodic transmission/reception.

The new scheduled frame number $F_{S, new}$ may have a smaller value than the current frame number $F_C$ according to the transmission/reception period. Therefore, the determining unit 170 updates the existing scheduled frame number $F_S$ with the new scheduled frame number $F_{S, new}$ generated by the above-mentioned operation, and the operator 160 repeats the above-mentioned operation so that the D value of the new scheduled frame number $F_{S,new}$ becomes larger than 0 and smaller than the reference value (S213).

If the D value of the new scheduled frame number $F_{S,new}$ becomes larger than 0 and smaller than the reference value Dth, it is determined as cases shown in FIG. 6 or FIG. 7. If the D value obtained by repeating the operation using Equation 3 is 0, the current frame is transmitted/received as shown in FIG. 4.

The frame determining unit 118 sets a criterion number of times for the operation using Equation 3, and the operator 160 performs the operation using Equation 3 the criterion number of times or less so that time required for the scheduled frame number update is prevented from exceeding the worst MAP decoding time given during system design.

The criterion number of times may satisfy $0<N_{update}<<0Xffffff$.

Therefore, if a MAP is normally received in the next frame, since the D value is larger than the reference value Dth, even though the new scheduled frame number $F_{S,new}$ is calculated, update starts from the scheduled frame number $F_S$ having been updated in the previous frame and thus update time deceases.

The criterion number of times may be variously set according to the design of the mobile station.

The above-mentioned exemplary embodiments of the present invention are not only embodied by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:
1. A signal processor for use in a communication device, the signal processor comprising:
a perceiving unit configured to acquire an initial scheduled frame number and a current frame number from MAP information;

an operator unit configured to receive the initial scheduled frame number and the current frame number from the perceiving unit, and calculate a difference between the initial scheduled frame number and the current frame number; and a determining unit configured to compare the difference between the initial scheduled frame number and the current frame number with a reference value, and set a new scheduled frame number based on a result of the comparison, wherein if the difference between the initial scheduled frame number and the current frame number is equal to zero, the determining unit further is configured to determine the current frame number as a scheduled frame number, and wherein if the difference between the initial scheduled frame number and the current frame number is larger than the reference value, the determining unit further is configured to determine that the mobile station has normally received the MAP after the scheduled frame due to MAP loss.

2. The signal processor of claim 1, wherein the perceiving unit further is configured to analyze a MAP of the current frame to acquire the initial scheduled frame number and the current frame number.

3. The signal processor of claim 1, wherein if a transmission or reception is non-periodic, the determining unit further is configured to determine that transmission or reception has failed.

4. The signal processor of claim 1, wherein if a transmission or reception is periodic, the determining unit further is configured to calculate the sum of the initial scheduled frame number and a period of the periodic transmission or reception to acquire a new scheduled frame number.

5. The signal processor of claim 4, wherein the operator unit further is configured to recalculate the difference between the acquired new scheduled frame number and the current frame number.

6. The signal processor of claim 5, wherein the determining unit further is configured to update the scheduled frame number until the difference between the updated scheduled frame number and the current frame number becomes larger than 0 and smaller than the reference value.

7. The signal processor of claim 6, wherein the determining unit further is configured to update the scheduled frame number a threshold number of times or less.

8. The signal processor of claim 1, wherein if the transmission or reception is periodic, the reference value is larger than the period of transmission or reception.

9. A communication method comprising:
receiving MAP information;
acquiring an initial scheduled frame number and a current frame number from the MAP information;
calculating a difference between the initial scheduled frame number and the current frame number;
comparing the difference between the initial scheduled frame number and the current frame number with a reference value and setting a scheduled frame number based on a result of the comparison; and
performing transmission or reception in the scheduled frame,
wherein in the setting of the scheduled frame number, the scheduled frame number is calculated according to the period of transmission or reception if the difference between the initial scheduled frame number and the current frame number is larger than the reference value.

10. The communication method of claim 9, wherein in the setting of the scheduled frame number, the current frame is determined as the scheduled frame if the difference between the initial scheduled frame number and the current frame number is 0.

11. The communication method of claim 9, wherein the scheduled frame number is determined according to the sum of the initial scheduled frame number and the period of the signal.

12. The communication method of claim 11, wherein the scheduled frame number is updated until the difference between the scheduled frame number and the current frame number becomes larger than 0 and smaller than the reference value.

13. The communication method of claim 12, wherein the scheduled frame number is updated a threshold number of times or less.

14. The communication method of claim 10, wherein if the transmission or reception is periodic, the reference value is larger than the period of the transmission or reception.

* * * * *